Patented Apr. 7, 1942

2,278,499

UNITED STATES PATENT OFFICE 2,278,499

AMINE SALTS

Frank B. Smith and John N. Hansen, Midland, Mich., assignors to The Dow Chemical Company, Midland, Mich., a corporation of Michigan No Drawing. Application June 15, 1940,
Serial No. 340,846

11 Claims. (Cl. 260—501)

This invention is concerned with water soluble salts of aromatic-aliphatic acids and is particularly directed to the alkanolamine salts of naphthyl-substituted monatomic-aliphatic acids.

Naphthyl-aliphatic acids such as alpha- and beta-naphthyl acetic and propionic acids have been found of value for the treatment of plants to regulate plant development. They are particularly recommended for use in aqueous solutions adapted to be employed in the stimulation of the root growth of cuttings. These compounds, however, are so insoluble in water that aqueous solutions are very difficult to obtain.

We have discovered that the alkanolamine salts of the naphthyl-substituted monatomic aliphatic acids have all the desirable properties of plant stimulation inherent in the acids themselves, and are very soluble in water. Furthermore, these amine salts do not decompose on contact with carbon dioxide and air. Concentrated water solutions can be made therefrom and stored indefinitely without undergoing decomposition or reduction in effectiveness. The new salt compounds are somewhat soluble in many common organic solvents and stable to light and heat.

The compounds may be prepared by heating a naphthyl-substituted aliphatic acid with an alkanolamine to a temperature at which the mixture becomes liquid. The heating is continued and the mixture agitated until a homogeneous reaction product is obtained. The crude product is then cooled and purified as may be desired. If the alkanolamine salt as obtained is a solid, it may be recrystallized from a suitable water free organic solvent. If the salt is normally liquid the crude reaction product may be dispersed in or washed with a cold solvent in which the salt compound is difficultly soluble to extract from the mixed product traces of amine and acid. Solvents found suitable in such purification procedure include chloroform, carbon tetrachloride, and alcohol-chloroform mixtures.

Substantially equimolecular proportions of the reactants have been found to give the desired alkanolamine salt in good yield. Any suitable proportions, however, can be employed, the unreacted excess acid or amine either removed or allowed to remain in the crude mixture as desired. The crude products of the reaction can be employed advantageously without subsequent purification in the preparation of concentrates or dilute plant treatment solutions.

The following examples illustrate the preparation of certain representative salts, but are not to be construed as limiting the invention.

Example 1

18.6 grams (0.1 mol) of alpha-naphthyl acetic acid and 15.4 grams (0.103 mol) of triethanolamine were stirred and heated together until a substantially homogeneous product was obtained. The crude triethanolamine salt of alpha-naphthyl acetic acid was a straw colored viscous liquid at room temperature. The product has a relative density of 1.212 at 35° C. compared with water at 25° C., and appears to be miscible in all proportions with water.

Example 2

13.1 grams (0.125 mol) of diethanolamine and 18.6 grams (0.1 mol) of alpha-naphthyl acetic acid were heated and stirred together to form a dark reddish brown liquid. This product solidified on cooling and was recrystallized from chloroform to obtain the desired diethanolamine salt of alpha-naphthyl acetic acid in the form of white crystals. These crystals were washed several times with cold carbon tetrachloride and thereafter dried to obtain a product melting at 79°–84° C. and soluble to the extent of 690 grams in 100 milliliters of water at 25° C.

Example 3

18.6 grams (0.1 mol) of alpha-naphthyl acetic acid and 6.1 grams (0.1 mol) of monoethanolamine were mixed together and heated until a solution was obtained. This product was stirred to insure obtaining of a homogeneous mixture and thereafter solidified by cooling. Upon recrystallization from an ethyl alcohol-chloroform mixture, the monoethanolamine salt of alpha-naphthyl acetic acid was obtained as a white crystalline compound melting at 109°–110° C. This compound is soluble to the extent of 276 grams per 100 milliliters of water.

In a similar manner other alkanolamines may be reacted with alpha-naphthyl acetic acid substantially as described in the foregoing examples to obtain the corresponding addition salts of mono-, di-, and tri-n-propanolamines; mono-, di-, and tripentanolamines; 1.2-dihydroxy-3-amino-propane and the like. Similarly such naphthyl-substituted monatomic aliphatic acids as beta-naphthyl acetic acid, alpha-naphthyl propionic acid, beta-naphthyl propionic acid, alpha-naphthyl petanoic acid, alpha-naphthyl hexanoic acid, and the like may be reacted with the several alkanolamines to obtain compounds falling within the scope of the invention.

The addition salts of the alkanolamines and naphthyl aliphatic acids with which the present invention is particularly concerned are those having the following formula:

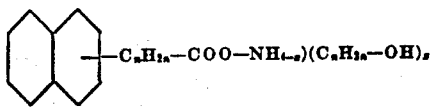

wherein $n$ is an integer and $x$ is an integer not greater than 3.

We claim:

1. A compound having the formula:

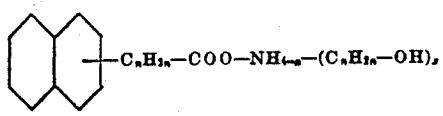

wherein $n$ is an integer, and $x$ is an integer not greater than 3.

2. An alkanolamine salt of a naphthyl acetic acid.
3. An alkanolamine salt of alpha-naphthyl acetic acid.
4. An ethanolamine salt of alpha-naphthyl acetic acid.
5. The monoethanolamine salt of alpha-naphthyl acetic acid.
6. The diethanolamine salt of alpha-naphthyl acetic acid.
7. The triethanolamine salt of alpha-naphthyl acetic acid.
8. An ethanolamine salt of a naphthyl-substituted aliphatic acid having the formula

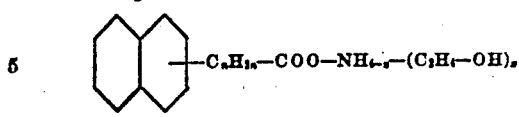

wherein $n$ is an integer, and $x$ is an integer not greater than 3.

9. A monoethanolamine salt of a naphthyl-substituted aliphatic acid having the formula

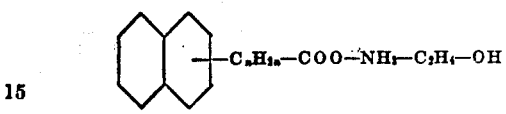

wherein $n$ is an integer.

10. A diethanolamine salt of a naphthyl-substituted aliphatic acid having the formula

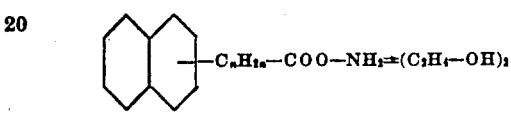

wherein $n$ is an integer.

11. A triethanolamine salt of a naphthyl-substituted aliphatic acid having the formula

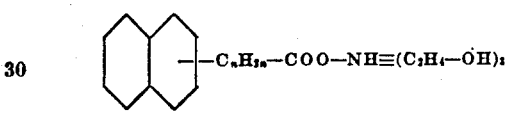

wherein $n$ is an integer.

FRANK B. SMITH.
JOHN N. HANSEN.